US012278079B1

(12) United States Patent
Sar

(10) Patent No.: US 12,278,079 B1
(45) Date of Patent: Apr. 15, 2025

(54) LIGHTWEIGHT, THERMALLY STABLE DISK FOR A COAXIAL TRAVELLING WAVE TUBE (CoTWT)

(71) Applicant: Raytheon Company, Arlington, VA (US)

(72) Inventor: David R. Sar, Marana, AZ (US)

(73) Assignee: Raytheon Company, Arlington, VA (US)

( * ) Notice: Subject to any disclaimer, the term of this patent is extended or adjusted under 35 U.S.C. 154(b) by 540 days.

(21) Appl. No.: 17/836,626

(22) Filed: Jun. 9, 2022

Related U.S. Application Data

(60) Provisional application No. 63/328,013, filed on Apr. 6, 2022.

(51) Int. Cl.
*H01J 23/12* (2006.01)
*H01J 25/34* (2006.01)

(52) U.S. Cl.
CPC .............. *H01J 23/12* (2013.01); *H01J 25/34* (2013.01)

(58) Field of Classification Search
CPC .................................. H01J 23/12; H01J 25/34
See application file for complete search history.

(56) References Cited

U.S. PATENT DOCUMENTS 3,662,212 A 5/1972 Rawls
3,823,772 A * 7/1974 Lavering ................ H01B 17/26 313/30
9,819,320 B1 11/2017 Hoff et al.
2008/0024251 A1* 1/2008 Soga ........................ H01P 5/103 333/243
2008/0246553 A1* 10/2008 Okamoto ................ H01P 5/103 333/26
2023/0343542 A1* 10/2023 Sar .......................... H01J 23/24

OTHER PUBLICATIONS

"International Application Serial No. PCT US2023 011624, International Search Report mailed May 9, 2023", 4 pgs.
"International Application Serial No. PCT US2023 011624, Written Opinion mailed May 9, 2023", 6 pgs.

* cited by examiner

*Primary Examiner* — Patricia T Nguyen
(74) *Attorney, Agent, or Firm* — Schwegman Lundberg & Woessner, P.A.

(57) ABSTRACT

A lightweight, thermally stable disk for use in a slow wave structure (SWS) of CoTWT is configurated without sacrificing thermal management, structural integrity, or RF performance. Refractory metal is removed from regions of the disk where no RF interaction is expected and replaced with resistive ceramic material. The disk includes one or more central ribs positioned about the periphery of a central hub. A plurality of U-shaped receptacles may extend from the one or more central ribs. The disk is plated with a patterned metal to define laminar conductive tabs spaced around the periphery that are separated by solid resistive ceramic tabs and to electromagnetically connect all exposed refractory metal surfaces. The plating metal must be capable of being deposited and patterned in a thin layer of 10 to 100 microns, exhibit a Young's Modulus of <100 GPa to provide both the ductility and malleability to plastically deform and exhibit an electrical conductivity at least and preferably greater than that of the refractory metal.

20 Claims, 9 Drawing Sheets

200

| MATERIAL | STRENGTH (GPa) | THERMAL CONDUCTIVITY (W/m•°K) | CTE ($10^6$•°K) | ELECTRICAL RESISTIVITY (nΩ•m) | YOUNG'S MODULUS (GPa) | WEIGHT DENSITY (g/cc) |
|---|---|---|---|---|---|---|
| REFRACTORY METAL | | | | | | |
| TUNGSTEN | 310 | 173 | 4.5 | 52.8 | 411 | 19.3 |
| MOLYBDENUM | 230 | 138 | 4.8 | 53.4 | 329 | 10.28 |
| TANTALUM | 200 | 57.5 | 6.3 | 131 | 186 | 16.69 |
| CERAMIC | | | | | | |
| ALUMINA | 228 | 35 | 8.4 | $10^{15}$ | 375 | 3.88 |
| SILICON CARBIDE | 550 | 120 | 4 | $10^6$ | 400 | 3.16 |
| PLATING METAL | | | | | | |
| GOLD | 180 | 318 | 14.2 | 22.14 | 79 | 19.3 |
| SILVER | 100 | 429 | 18.9 | 15.87 | 83 | 10.5 |
| COPPER | 140 | 401 | 16.5 | 16.78 | 115 | 8.96 |

FIG. 2

LIGHTWEIGHT, THERMALLY STABLE DISK FOR A COAXIAL TRAVELLING WAVE TUBE (CoTWT)

CROSS-REFERENCE TO RELATED APPLICATIONS

This application claims benefit of priority under 35 U.S.C. 119 (e) to U.S. Provisional Application No. 63/328,013 entitled "Monolithic, Thermally Stable Slow Wave Structure Element" and filed on Apr. 6, 2022, the entire contents of which are incorporated by reference.

GOVERNMENT LICENSE RIGHTS

This invention was made with government support under HR0011-21-C-0205 awarded by DARPA. The government has certain rights in this invention.

BACKGROUND OF THE INVENTION

Field of the Invention

This invention relates to Coaxial Travelling Wave Tubes (CoTWTs) that provide amplification of propagating RF signals, and more particularly to lightweight, thermally stable disks that are spaced along the CoTWT to form a slow wave structure (SWS) to amplify the Transverse Electro-Magnetic (TEM) Mode of the RF signal while damping other non-TEM modes.

Description of the Related Art

One of the more common types of Radio Frequency (RF) amplification electron tubes is the Traveling Wave Tube, commonly referred to as a "TWT". All TWT's use an architecture called a Slow Wave Structure (SWS), in which a portion of the tube is specifically designed to encourage interaction between an input RF signal and an electron beam that runs through the tube. In traditional TWTs, this is accomplished using a helical copper coil where an electron beam is run through the center of the coil. The input RF signal is injected into the coil near the start of the electron beam. While the RF signal travels around the helix at nearly the speed of light, its effective velocity parallel to the electron beam is much less and is a function of the helix's pitch and radius. By careful adjustment of the electron beam voltage, it is possible to match the velocity of the electron beam with the parallel velocity of the input RF signal down the helix. This allows the input RF signal in the helix and the electron beam to interact electromagnetically such that the electron beam transfers a portion of its kinetic energy to the input RF signal, increasing its power as it travels through the helix. As the electron beam and input RF signal propagate down the tube, the increasing RF power interacts even more strongly with the electron beam, resulting in even more amplification as the input RF signal and electron beam continue through the tube towards an RF output at the opposite end of the helix. The amplified RF signal can often be several orders of magnitude larger than the original input RF signal.

A subset of the TWT class of tubes called Coaxial TWTs (CoTWTs, for short) utilizes a SWS which has the appearance of a plurality of conductive disks stacked along a metal rod or inner metal tube. This coaxial disk-loaded or "diskon-rod" TWT structure is described in U.S. Pat. No. 9,819,320 entitled "Coaxial Amplifier Device", issued Nov. 14, 2017.

In reference to FIG. 1, a current state of the art embodiment for a CoTWT 100 includes a plurality of disks 102 spaced from each other by a precalculated distance 104 and all stacked onto a central rod or inner metal tube 106 to form a SWS 107. This assembly is then centered inside of a larger metal tube 108, to complete the coaxial structure. The outer tube 108 may be fabricated from commonly used vacuum compatible metals such as copper, bronze, or stainless steel. In the CoTWT, electron beam(s) 110 pass down the gap created between the SWS and the interior of the larger metal tube 108, while an input RF signal 112 is constrained to travel along the reticulated surface of the slow wave structure. Similar to the Helix TWT, the convoluted path of the input RF signal 112 slows down its effective linear velocity to where it can be matched with an electron beam of a particular voltage. This results in the same electromagnetic interaction and amplification of the input RF signal 112.

The coaxial nature of the CoTWT allows for considerable operational bandwidth utilizing a Transverse ElectroMagnetic (TEM) Mode 114 of the RF signal 112 that runs parallel to the central axis of the SWS. Each disk 102 includes an integrally formed metal gear 118 in which solid conductive tabs 120 are positioned around a central hub 122. Solid resistive ceramic tabs 124 are formed around the central hub in the gaps between the solid conductive tabs 120. The solid conductive tabs 120 provide low resistance paths parallel to the long axis of the SWS that allow the TEM Mode 114 to pass and to be amplified as it propagates along the structure. The solid resistive ceramic tabs 124 attenuate or damp out the non-TEM modes 116 that would otherwise spiral around the long axis of the SWS and rob energy from the TEM mode 116 of RF signal 112.

To match the thermal expansion of the resistive ceramic components, refractory metals such as tungsten, molybdenum, tantalum and Kovar® are commonly used for the metal gear 112 and inner metal tube 106. Refractory metals are pure metallic elements or alloys capable of retaining strength above 3500 degrees F. as accepted by the industry. These alloys are expensive, difficult to work with due to their mechanical properties, and very dense, which makes for a very heavy, cumbersome, and expensive slow wave structure. The refractory metal also provides the strength and thermal conductivity required of the SWS for high power amplification of the RF signal.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a lightweight, thermally stable disk for use in a slow wave structure (SWS) of a CoTWT. Without sacrificing thermal management or structural integrity, refractory metal is removed from regions of the disk where no RF interaction is expected and replaced with resistive ceramic material. The disk is plated with a patterned metal to define laminar conductive tabs spaced around the periphery that are separated by solid resistive ceramic tabs and to electromagnetically connect exposed refractory metal surfaces. The plating metal must be capable of being deposited and patterned in a thin layer of 10 to 100 microns, exhibit a Young's Modulus of <100 GPa to provide both the ductility and malleability to plastically deform due to CTE mismatch between the plating metal and the resistive ceramic/refractory metal and exhibit an electrical conductivity at least and preferably greater than that of the refractory metal. The disk appears electro-magnetically to the RF band as if the disk were a solid refractory metal with resistive ceramic tabs spaced around its periphery e.g., the RF performance of the disk is unaffected. This disk configuration reduces weight and lowers costs by replacing refractory metal with resistive ceramic or plating metal and reduces mechanical and thermal stresses within the disk by intermingling and bringing the volume of refractory metal and resistive ceramic closer to 50/50. Typical refractory metals may include Tungsten, Molybdenum and Tantalum while typical plating metals may include Gold, Silver and Copper.

In general, a disk includes a central hub having a front-to-back thickness t1 that sets the overall thickness of the disk. The central hub is formed of a refractory metal having a first CTE (CTE1) and an electrical conductivity (e1). One or more central ribs are formed of the same refractory metal and positioned in an inner ring around the periphery of the central hub and having a front-to-back thickness $t2<t1$. A resistive ceramic having a second CTE (CTE2) matched to CTE1 of the refractory metal encases the one or more central ribs in the inner ring and extends radially to form an outer ring. The resistive ceramic leaves exposed surfaces of refractory metal including, for example, a portion of an outer surface of the central hub. A patterned metal plates the resistive ceramic and exposed surfaces of refractory metal to electro-magnetically connect all exposed refractory metal surfaces and to form alternating solid resistive tabs and laminar conductive tabs (solid resistive ceramic plated with metal) in the outer ring around the periphery of the disk. As configured, the refractory metal occupies less than one-third of the volume of the inner ring and less than one-fourth of the volume of the outer ring which are otherwise encased in resistive ceramic. This reduces disk weight, cost and internal thermal stresses.

In an embodiment, a single continuous central rib having a thickness $t2<\frac{1}{3}*t1$ is positioned in the inner ring around the periphery of the central hub. A plurality of U-shaped receptacles of the same refractory metal are affixed around the periphery of the single continuous central rib and extend into the outer ring. The resistive ceramic fills a volume inside each U-shaped receptacle to form the solid resistive tabs and a volume between adjacent U-shaped receptacles. The patterned metal forms the laminar conductive tabs between and electromagnetically connecting adjacent U-shaped receptacles.

In another embodiment, a plurality of discrete central ribs is positioned in the inner ring around the periphery of the central hub. A plurality of U-shaped receptacles of the same refractory metal are affixed to the plurality of discrete central ribs, respectively, and extend into the outer ring. The resistive ceramic fills a volume inside each U-shaped receptacle to form the solid resistive tabs and a volume between adjacent U-shaped receptacles. The patterned metal forms the laminar conductive tabs between and electromagnetically connecting adjacent U-shaped receptacles.

In another embodiment, a single continuous central rib having a thickness $t2<\frac{1}{3}*t1$ or a plurality of discrete central ribs is positioned in the inner ring around the periphery of the central hub and extend into the outer ring. In this configuration, the laminar conductive tabs are not in direct contact with refractory metal, which reduces the heat dissipation capability and thus signal power that can be handled. The benefit is that this configuration without the U-shaped receptacles is easier and less expensive to fabricate.

In various embodiments, the patterned metal further defines mode selectable structures on the solid resistive or laminar conductive tabs configured to pass a desired TEM mode and to control undesired modes.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 2 is a table of various mechanical, electrical and thermal properties of suitable refractory metals, resistive ceramics and plating metals for the conductive disk;

DETAILED DESCRIPTION OF THE INVENTION

Figure 1:
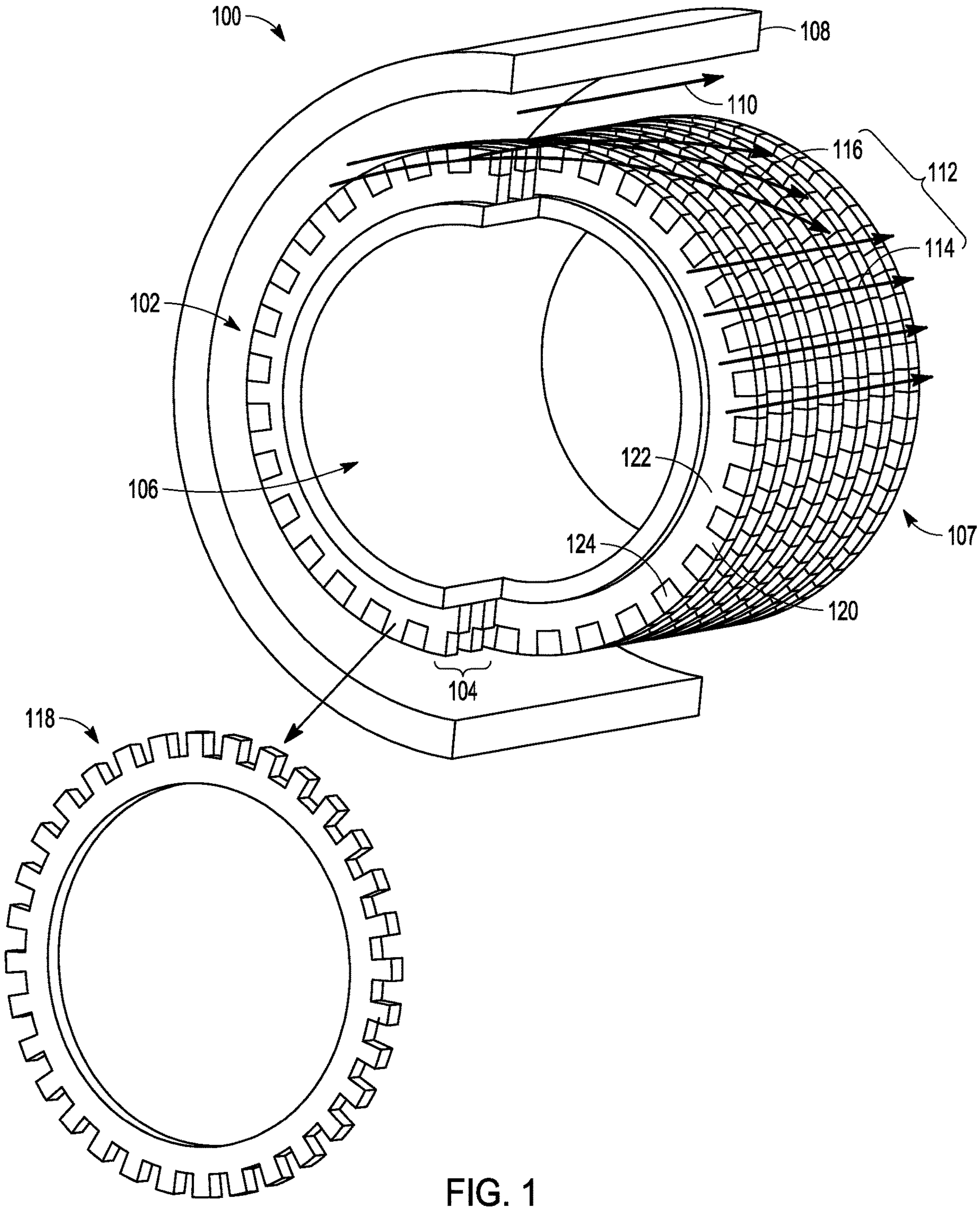
FIG. 1 (PRIOR ART)
FIG. 1, as described above, is a view of a CoTWTs in which a plurality of conductive disks are spaced along an inner metal tube positioned coaxially inside an outer metal tube to form a SWS to amplify RF signals.

In the present invention, a lightweight, thermally stable disk for use in a CoTWT is configured without sacrificing thermal management, structural integrity, or RF performance. Refractory metal is removed from regions of the disk where no RF interaction is expected and replaced with resistive ceramic material. The disk is plated with a patterned metal to define laminar conductive tabs spaced around the periphery that are separated by solid resistive ceramic tabs and to electromagnetically connect exposed refractory metal surfaces. The plating metal must be capable of being deposited and patterned in a thin layer of 10 to 100 microns, exhibit a Young's Modulus of <100 GPa to provide both the ductility and malleability to plastically deform due to CTE mismatch between the plating metal and the resistive ceramic/refractory metal and exhibit an electrical conductivity at least and preferably greater than that of the refractory metal. This disk configuration reduces weight and lowers costs by replacing refractory metal with resistive ceramic or plating metal and reduces mechanical and thermal stresses within the disk by intermingling and bringing the volume of refractory metal and resistive ceramic closer to 50/50. Typical refractory metals may include Tungsten, Molybdenum and Tantalum while typical plating metals may include Gold, Silver and Copper.

The operation of the SWS, as well as the spurious mode attenuation mechanism relies on the propensity of RF to travel primarily on the outer surface of metal structures, often referred to as the "Skin Effect". The magnitude of this effect is a function of the frequency of the RF and the conductivity of the selected metal. At microwave frequencies, and for commonly employed metals, the bulk of the electric current runs in a layer on the surface between 1 and 5 microns deep. In general, metal below the top 0.001 inch of the surface takes little part in the metal's interaction with an RF signal. This means that the TEM mode of the RF signal running parallel to the length of the SWS can follow surface paths that run along conductive tabs where there is little attenuation and maximum amplification gain. On the other hand, a spurious mode with a helical path is forced to follow metal surfaces that occasionally plunge beneath the resistive ceramic tabs, causing attenuation the spurious mode in the process.

By excluding refractory metal from regions where no RF interaction is expected, with the exception of what is needed for structural integrity and thermal management, and replacing the refractory metal with resistive ceramic similar to that used elsewhere in the design and a thin metal plating layer, the weight and cost of the design of the disk and the SWS is reduced, thermal stability is improved and manufacturability and robustness are increased without sacrificing RF performance. The presence of the additional resistive ceramic offers flexibility in the design unattainable with the current state of the art.

In general, a lightweight, thermally stable disk includes a central hub having a front-to-back thickness t1 that sets the overall thickness of the disk. The central hub is formed of a refractory metal having a first CTE (CTE1) and an electrical conductivity (e1). One or more central ribs are formed of the same refractory metal and positioned in an inner ring around the periphery of the central hub and having a front-to-back thickness $t2<t1$. A resistive ceramic having a second CTE (CTE2) matched to CTE1 of the refractory metal encases the one or more central ribs in the inner ring and extends radially to form an outer ring. A patterned metal plates the resistive ceramic and exposed surfaces of refractory metal to electromagnetically connect all exposed refractory metal surfaces and to form alternating solid resistive tabs and laminar conductive tabs (solid resistive ceramic plated with metal) in the outer ring around the periphery of the disk. As configured, the refractory metal occupies less than one-third of the volume of the inner ring and less than one-fourth of the volume of the outer ring which are otherwise encased in resistive ceramic. This reduces disk weight, cost and thermal stresses. In various embodiments, the patterned metal further defines mode selectable structures on the solid resistive or laminar conductive tabs configured to pass a desired TEM mode and to control undesired modes.

Referring now to FIG. 2, a Table 200 provides specifies various mechanical, electrical and thermal properties of suitable refractory metals, resistive ceramics and plating metals for use in the disk. In general, the resistive ceramic provides a relatively high electrical resistivity (making it resistive, but not so high as to be insulating) to dampen the non-TEM modes. Note, electrical conductivity is the reciprocal of electrical resistivity such that a high electrical resistivity equates to a low electrical conductivity and vice-versa. Resistive ceramics have a relatively low CTE. Refractory metals have a low CTE that can be matched to the resistive ceramic (e.g., suitably ½ to 1 part per million (PPM) per degree C.). The refractory metal is also the primary component to mechanically support the disk and provide a high thermal conductivity to remove heat. The refractory metal is typically quite a bit heavier than the ceramic such that its replacement with ceramic reduces the overall weight of the disk. The primary attribute of the plating metal is that it must be capable of being deposited and patterned (lift-off or etching process) in thin 10-100 micron layers. The frequency of the RF signal and conductivity of the plating metal determine the thickness required for the Skin Effect. These metals exhibit a CTE that is 2.5 times, typically 3-5×, that of the refractory metal and resistive ceramic. Accordingly, the plating metal must have a relatively low Young's Modulus, <100 GPa (Giga-Pascals), to provide both the ductility and malleability to plastically deform under thermally induced stress and strain. The plating metal should also be no more resistive, and preferably less resistive, than the refractory metal. The Table is merely exemplary, other refractory metals such as Kovar®, Invar and Inconel, resistive ceramics or plating metals such as Platinum, Indium, and Tin may be suitable. The selection of the appropriate refractory metal, resistive ceramic and plating metal will be application specific depending upon such factors as frequency range, power level etc.

Figure 3:
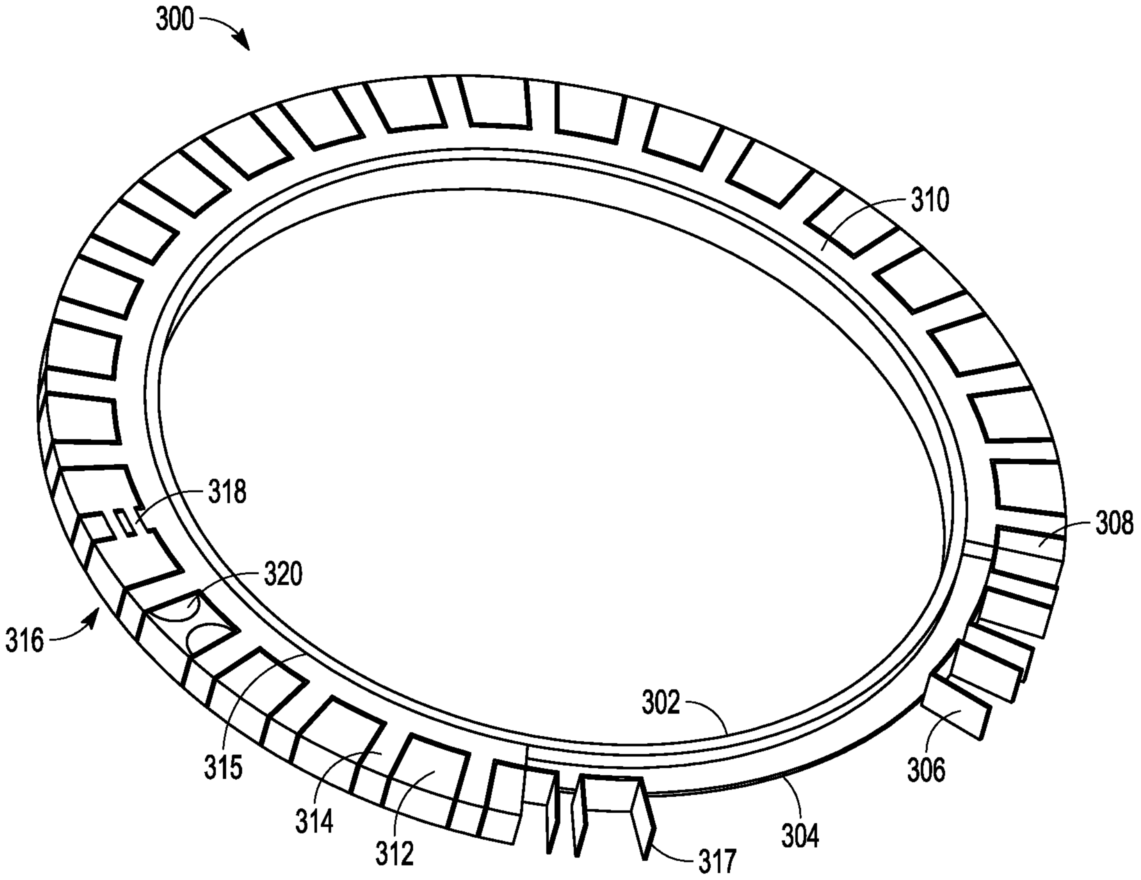
FIG. 3 is an illustration of an embodiment of disk in accordance with the invention in which a thin continuous central rib on a central hub supports a plurality of receptacles encased in resistive ceramic and plated with a patterned metal to define laminar conductive tabs.

Referring now to FIG. 3, an embodiment of a conductive disk 300, a plurality of which can be stacked on an inner metal tube to form a SWS for use in a CoTWT, includes a central hub 302 having a front-to-back thickness t1 that sets the overall thickness of the disk, a single continuous central rib 304 having a front-to-back thickness $t2<⅓*t1$ positioned in an inner ring around the periphery of the central hub 302, and a plurality of square bottomed U-shaped receptacles 306 having the same front-to-back thickness t1 as the central hub affixed around the periphery of the single continuous central rib 304 and extending into an outer ring. The central rib 304 may be centered on the central hub 302 or offset to one side. A resistive ceramic 308 encases the central rib 304 and the plurality of U-shaped receptacles 306. The central hub 302, single continuous central rib 304 and the plurality of U-shaped receptacles 306 are formed from the same refractory metal selected to CTE match the resistive ceramic.

A patterned metal 310 plates resistive ceramic 308 and exposed surfaces of refractory metal (e.g., central hub 302 and receptacles 306) to electro-magnetically connect all exposed refractory metal surfaces and to form alternating solid resistive tabs 312 and laminar conductive tabs 314 (bulk resistive ceramic 308 plated with metal 310) in an outer ring around the periphery of the disk. Note, the patterned metal 310 does not have to plate every exposed refractory metal surface in order to connect all exposed refractory metal surfaces. For example, patterned metal 310 is in direct contact with a portion of an outer surface 315 of central hub 302 above and below central rib 304 but (as shown) does not plate the top and bottom exposed surfaces of central hub 302. The resistive ceramic 308 fills a volume inside each U-shaped receptacle to form the solid resistive tabs 312 and a volume between adjacent U-shaped receptacles to form the bulk resistive ceramic of the laminar conductive tabs. The patterned metal 310 forms the laminar conductive tabs between and electromagnetically connecting adjacent U-shaped receptacles 306. The patterned metal 310 directly contacts an outer edge 317 of each side of the U-shaped receptacle. The purpose of the receptacles 306 is to hold the active portion of the resistive ceramic 308 and to guide unwanted RF modes through it. The precise number of the receptacles 306 is dependent of the other specific tube parameters such as desired bandwidth and out of band noise.

The patterned metal 310 serves to electromagnetically connect all the metal receptacles 306 and the central hub 302. It also coats and seals the resistive ceramic 308 areas not filling the receptacles 306 making the disk appear, from an electromagnetic standpoint, as if it were a solid piece of metal with resistive ceramic tabs around the periphery. In other words, the disk 300 appears electromagnetically in the RF band of interest to be equivalent to the state-of-the-art solid refractory metal disk. But disk 300 is much lighter weight, less expensive to build and is more thermally stable because the composition of refractory metal and resistive ceramic materials is closer to 50/50 and the materials are intermingled throughout the structure.

Because of the matched CTEs of the selected refractory metal and resistive ceramic, the main structure of the disk is not subject to mechanical stresses due to temperature change. At the same time, the patterned metal 310 being composed of highly ductile and malleable metal (Young's Modulus<100 GPa) and much thinner in aspect than the inner vane structure, will plastically deform under thermal changes without imparting significant stress or strain on the inside structures, yielding a SWS structure that is suitable for the thermal rigors of high vacuum high temperature tube processing for electron devices.

In various embodiments, the patterned metal 310 further defines mode selectable structures 316 (such as frequency selectable structures, resonators, notch filters, structures to specifically target a particular mode, etc) on the solid resistive or laminar conductive tabs configured to pass a desired TEM mode and to control undesired modes. For example, etched lines 318 through a conductive tab exposes non-TEM modes to additional ceramic material, hence damping and a shaped metal structure 320 on a resistive tab tunes the structure to reduce damping.

Figure 4A:
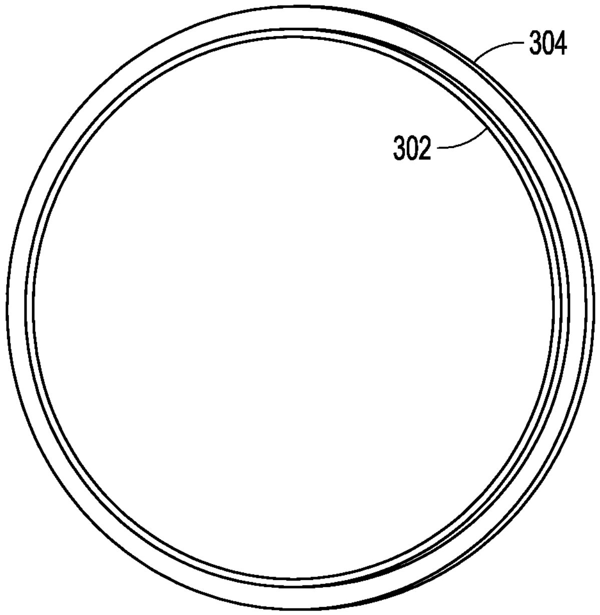
FIGS. 4A-4E are an illustration of an embodiment for fabricating the disk shown in FIG. 3.
Figure 4B:
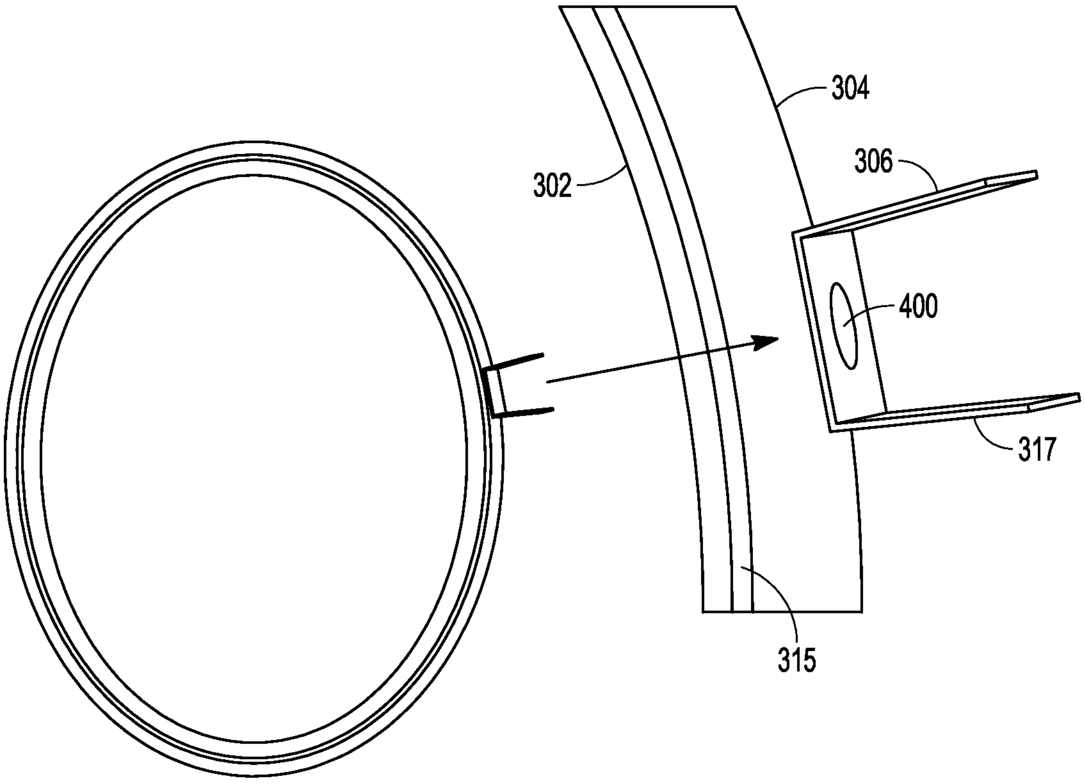
Figure 4C:
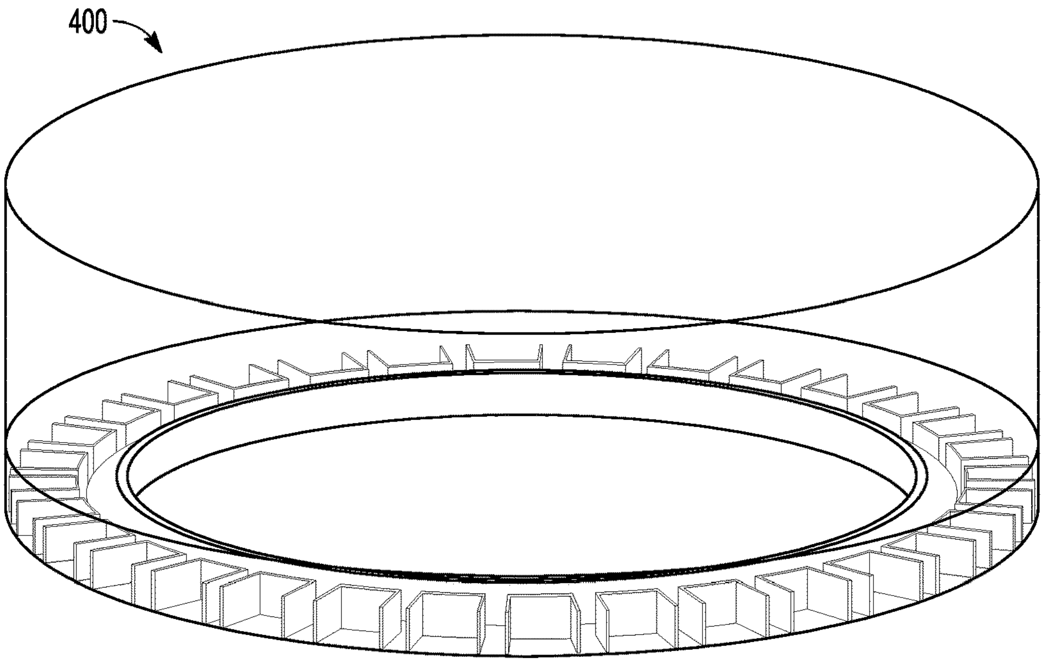
Figure 4D:
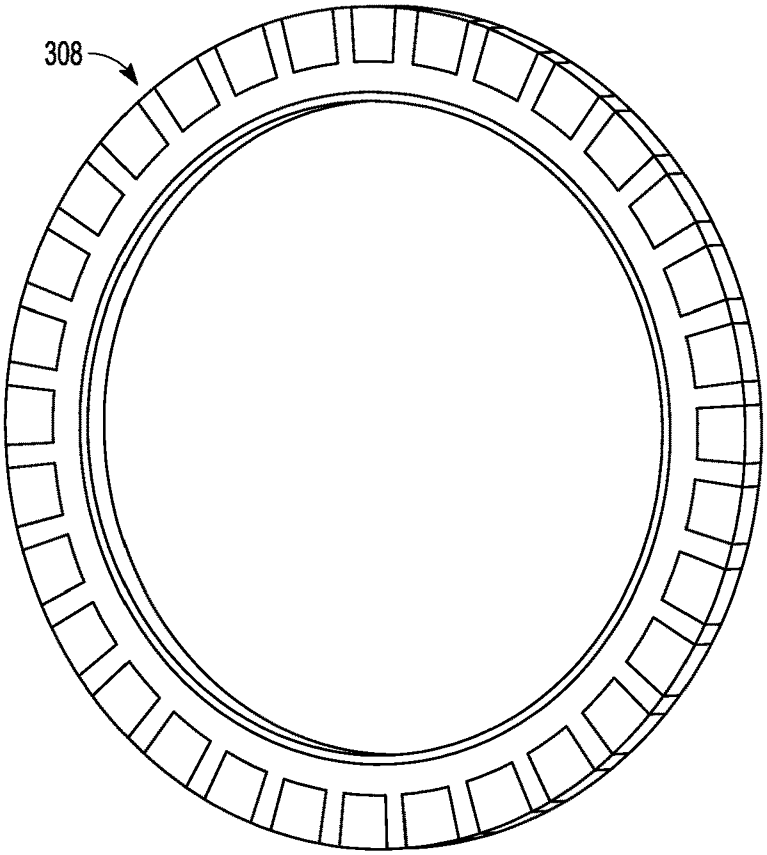
Figure 4E:
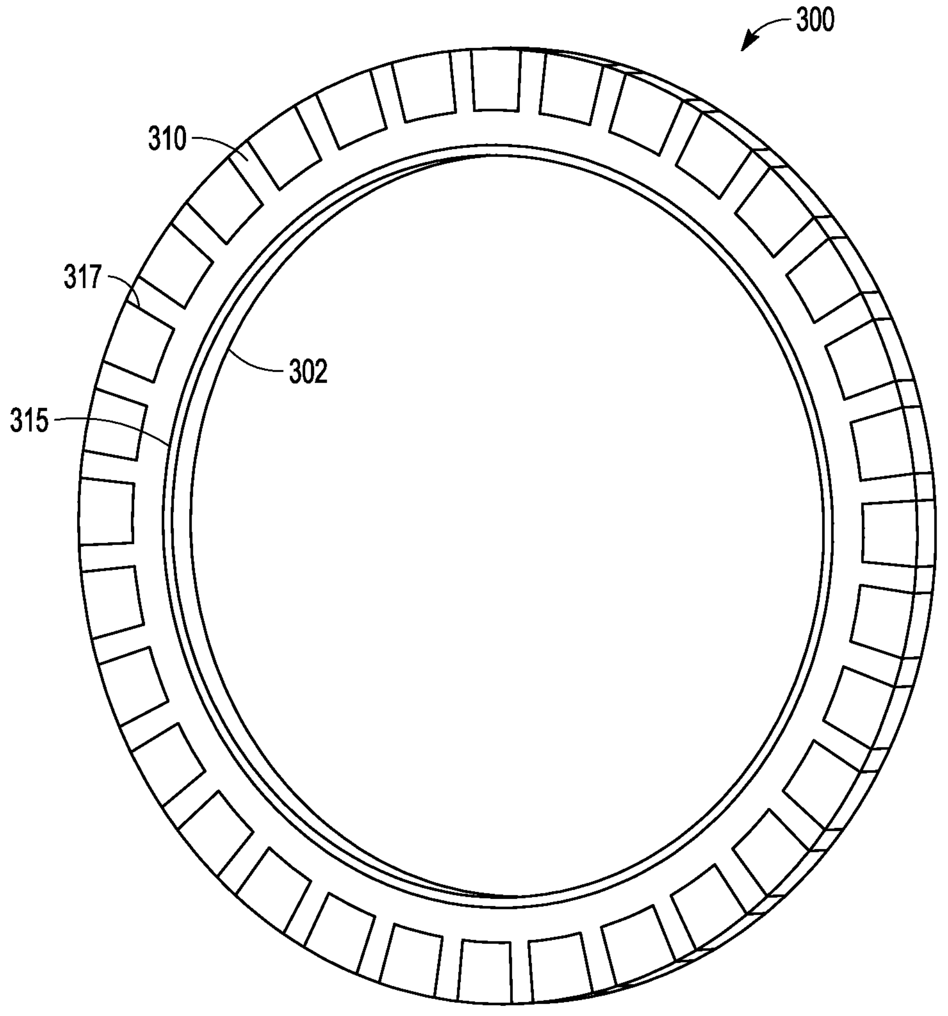

An embodiment for fabricating the disk 300 is illustrated in FIGS. 4A-4E. As shown in FIG. 4A, a refractory metal is machined to integrally form the central hub 302 and single continuous central rib 304. As shown in FIG. 4B, each U-shaped receptacle 306 is attached via a tack weld 400 around the periphery of the single continuous central rib 304. As shown in FIG. 4C the refractory metal structure is placed in a mold 402 and slip cast or injected molded in a resistive ceramic slurry. The structure is removed from mold 402 when dry and fired in a kiln to densify and bond the resistive ceramic 308 to the refractory metal structure. As shown in FIG. 4D, after kiln firing, the structure is lapped to a final thickness and circumference and to expose requisite refractory metal surfaces. As shown in FIG. 4E, the patterned metal 310 can be formed by masking off areas in which the ceramic is to be exposed, plating the structure with metal and lifting off the mask or by plating the entire structure and then etching the metal to yield disk 300. As shown, patterned metal 310 is in direct contact with a portion of an outer surface 317 of central hub 302 and an outer edge 317 of each U-shaped receptacle 306.

Figure 5:
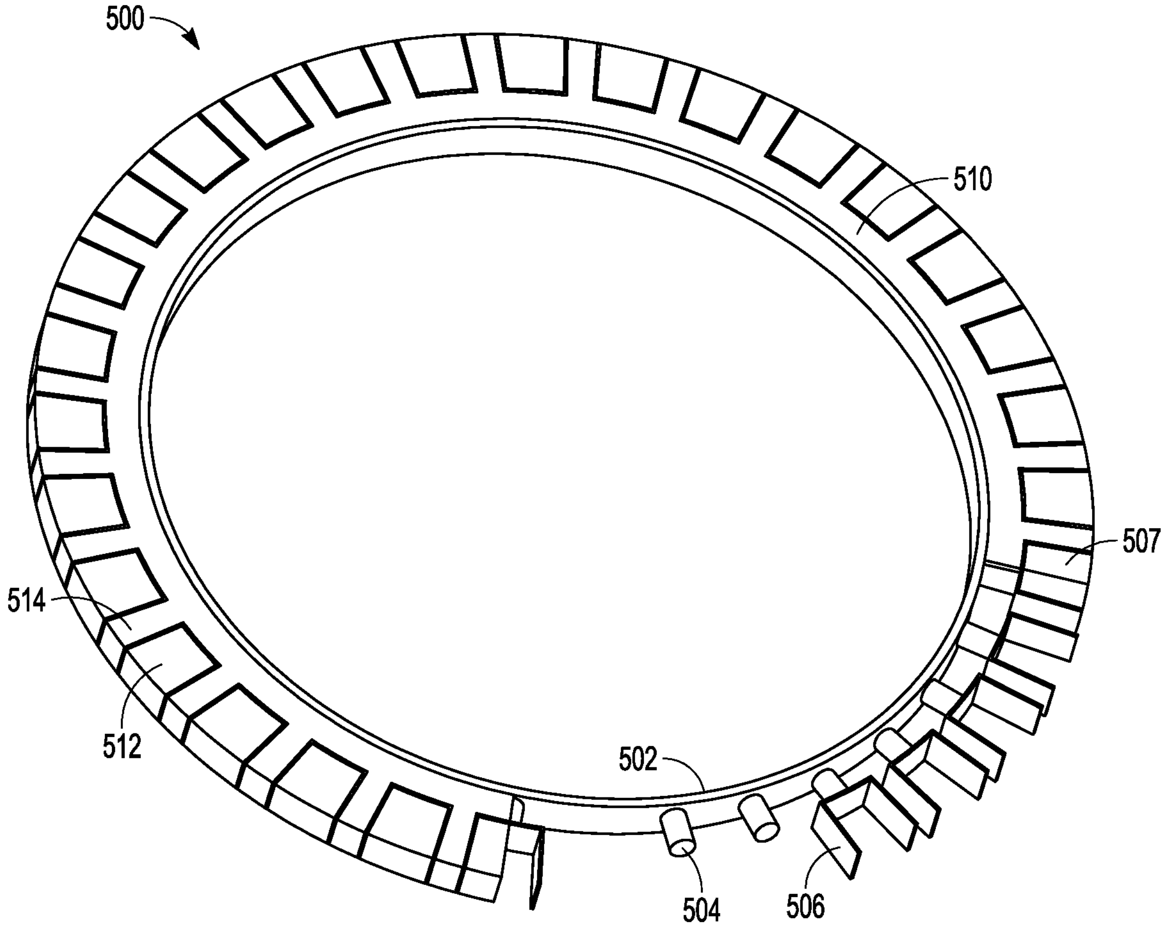
FIG. 5 is an illustration of an embodiment of disk in accordance with the invention in which a plurality of posts on a central hub support a respective plurality of receptacles encased in resistive ceramic and plated with a patterned metal to define laminar conductive tabs.

Referring now to FIG. 5, an embodiment of a conductive disk 500, a plurality of which can be stacked on an inner metal tube to form a SWS for use in a CoTWT, includes a central hub 502 having a front-to-back thickness t1 that sets the overall thickness of the disk, a plurality of discrete ribs (or posts) 504 positioned in an inner ring around the periphery of the central hub 502, and a plurality of square bottomed U-shaped receptacles 506 having the same front-to-back thickness t1 as the central hub affixed to respective discrete ribs 504 and extending into an outer ring. A resistive ceramic 508 encases the discrete ribs 504 and the plurality of U-shaped receptacles 506. The central hub 502, discrete ribs 504 and the plurality of U-shaped receptacles 506 are formed from the same refractory metal selected to CTE match the resistive ceramic. As before, a patterned metal 510 plates resistive ceramic 508 and exposed surfaces of refractory metal (e.g., a portion of an outer surface of central hub 502 and an outer edge of receptacles 506) to electro-magnetically connect all refractory metal and to form alternating solid resistive tabs 512 and laminar conductive tabs 514 (bulk resistive ceramic 508 plated with metal 510) in an outer ring around the periphery of the disk.

In the described embodiments, the plating metal is in direct contact with both the refractory metal central hub and U-shaped receptacles. This improves heat transfer via the refractory metal away from the RF surfaces, thus facilitating high power operation. In some cases high power operation is not required. In such instances, the design of the disk can be simplified by, for example, foregoing the U-shaped receptacles making it easier and less expensive to fabricate. The plating metal is still in contact with the refractory metal at the central hub, and thus in contact in a DC sense. However, in the RF band the lack of the metal receptacles alters the path of the RF energy and lowers thermal conductivity, making this suitable for low power operation exclusively.

Figure 6:
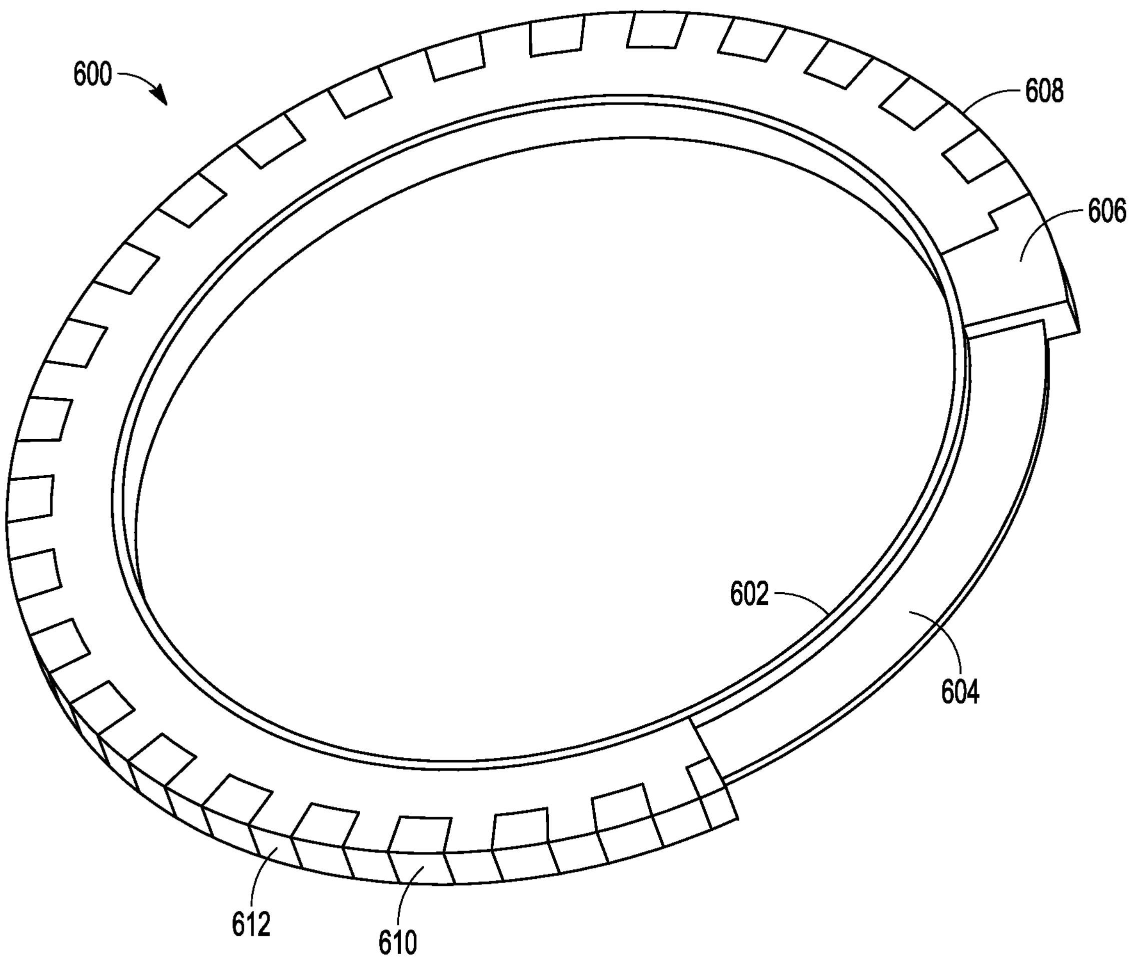
FIG. 6 is an illustration of an embodiment of disk in accordance with the invention in which a thin continuous central rib encased in resistive ceramic extends from a central hub and is plated with a patterned metal to define laminar conductive tabs.

As shown in FIG. 6, in an embodiment a disk 600 includes a central hub 602 having a front-to-back thickness t1 that sets the overall thickness of the disk and a single continuous central rib 604 having a front-to-back thickness t2<⅓*t1 positioned in an inner ring around the periphery of the central hub 602 and extending into an outer ring. A resistive ceramic 606 encases the single continuous central rib 604. A patterned metal 608 plates resistive ceramic 606 and the exposed surface of central hub 602 to electro-magnetically connect all refractory metal and to form alternating solid resistive tabs 610 and laminar conductive tabs 612 in the outer ring around the periphery of the disk. The laminar conductive tabs 612 are not in direct contact with the central rib 604, thus reducing heat transfer capability and power handling.

Figure 7:
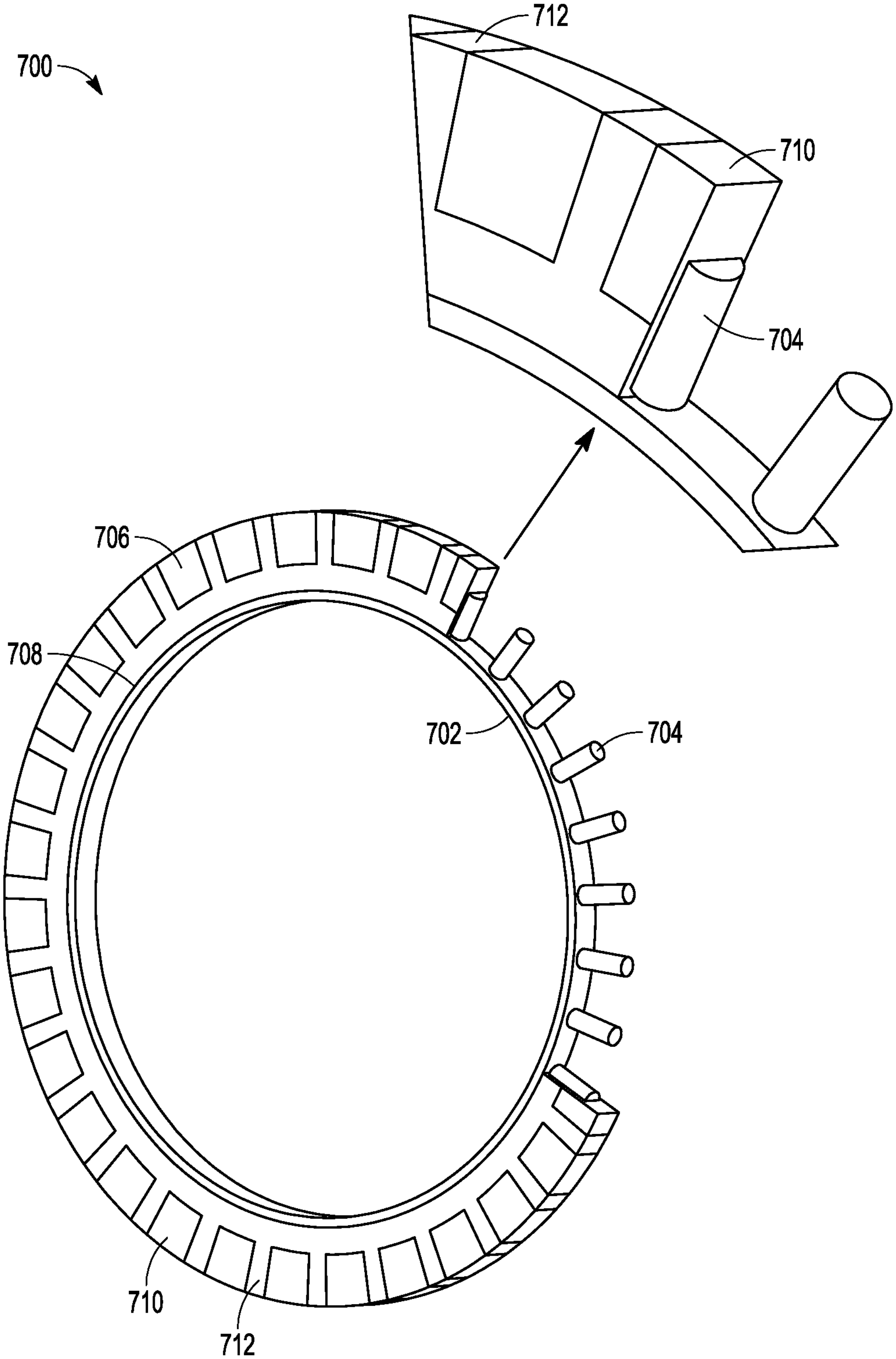
FIG. 7 is an illustration of an embodiment of disk in accordance with the invention in which a plurality of posts encased in resistive ceramic extend from a central hub and are plated with a patterned metal to define laminar conductive tabs.

As shown in FIG. 7, in an embodiment a disk 700 includes a central hub 702 having a front-to-back thickness t1 that sets the overall thickness of the disk and a plurality of discrete central ribs (or posts) 704 positioned in an inner ring around the periphery of the central hub 702 and extending into an outer ring. A resistive ceramic 706 encases the plurality of central ribs 704. A patterned metal 708 plates resistive ceramic 706 and the exposed surface of central hub 702 to electro-magnetically connect all refractory metal and to form alternating solid resistive tabs 710 and laminar conductive tabs 712 in the outer ring around the periphery of the disk. In this embodiment, each central rib 702 extends into a solid resistive tab 710. The laminar conductive tabs 712 are not in direct contact with the central ribs 704, thus reducing heat transfer capability and power handling.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A co-axial traveling wave tube (CoTWT) for propagation and amplification of RF signals, comprising:

an outer metal tube having an axis, an inner metal tube positioned along the axis, a plurality of disks spaced apart by distance d along the inner metal tube, each said disk comprising, a central hub having a front-to-back thickness t1 that sets the overall thickness of the disk, said central hub formed of a refractory metal having a first coefficient of thermal expansion (CTE1) and an electrical conductivity (e1);

one or more central ribs formed of the same refractory metal and positioned in an inner ring around the periphery of the central hub and having a front-to-back thickness t2<t1;

a resistive ceramic having a second CTE (CTE2) matched to CTE1 of the refractory metal that encases the one or more central ribs in the inner ring and extends radially to form an outer ring, said resistive ceramic leaving exposed refractory metal surfaces; and a patterned metal that plates the resistive ceramic and exposed refractory metal surfaces to electro-magnetically connect all exposed refractory metal surfaces and to form alternating solid resistive and laminar conductive tabs in the outer ring around the periphery of the disk, wherein said metal has an electrical conductivity e2>=e1, is not CTE matched to the refractory metal and resistive ceramic, and a Young's Modulus of less than 100 GPa that allows the plating to plasticly deform, wherein the disk appears electro-magnetically to the RF band as if the disk were a solid refractory metal with resistive ceramic tabs spaced around its periphery.

2. The CoTWT of claim 1, wherein the refractory metal is one of Tungsten, Molybdenum and Tantalum.

3. The CoTWT of claim 1, wherein a single continuous central rib having a thickness t2<⅓*t1 is positioned in the inner ring around the periphery of the central hub, further comprising a plurality of U-shaped receptacles of the same refractory metal affixed around the periphery of the single continuous central rib and extending into the outer ring, said resistive ceramic filling a volume inside each U-shaped receptacle to form the solid resistive tabs and a volume between adjacent U-shaped receptacles and leaving exposed refractory metal surfaces including a portion of an outer surface of the central rib and an outer edge of the U-shaped receptacles, said patterned metal forming the laminar conductive tabs between the U-shaped receptacles and plating the exposed outer edges of the U-shaped receptacles to electromagnetically connect adjacent U-shaped receptacles and plating the exposed portion of the outer surface of the central rib.

4. The CoTWT of claim 1, wherein a single continuous central rib having a thickness t2<⅓*t1 is positioned in the inner ring around the periphery of the central hub and extends into the outer ring, said resistive ceramic leaves exposed an outer surface of the central rib, wherein said patterned metal plates the exposed portion of the outer surface of the central rib but is not in direct contact with said single continuous central rib.

5. The CoTWT of claim 1, wherein a plurality of discrete central ribs are positioned in the inner ring around the periphery of the central hub, further comprising a plurality of U-shaped receptacles of the same refractory metal affixed to the plurality of discrete central ribs, respectively, and extending into the outer ring, said resistive ceramic filling a volume inside each U-shaped receptacle to form the solid resistive tabs and a volume between adjacent U-shaped receptacles and leaving exposed refractory metal surfaces including a portion of an outer surface of the central rib and an outer edge of the U-shaped receptacles, said patterned metal forming the laminar conductive tabs between the U-shaped receptacles and plating the exposed outer edges of the U-shaped receptacles to electromagnetically connect adjacent U-shaped receptacles and plating the exposed portion of the outer surface of the central rib.

6. The CoTWT of claim 1, wherein a plurality of discrete central ribs are positioned in the inner ring around the periphery of the central hub and extend into the outer ring, said resistive ceramic leaves exposed an outer surface of the central rib, wherein said patterned metal plates the exposed portion of the outer surface of the central rib but is not in direct contact with said plurality of discrete central ribs.

7. The CoTWT of claim 1, wherein each laminar conductive tab includes a bulk resistive ceramic and patterned metal on top, bottom and an outward facing surface of the bulk resistive ceramic.

8. The CoTWT of claim 1, wherein the patterned metal is one of Gold, Silver and Copper.

9. The CoTWT of claim 1, wherein the patterned metal is 10 to 100 microns thick.

10. The CoTWT of claim 1, wherein the e2>e1.

11. The CoTWT of claim 1, wherein the CTE of the patterned metal is at least 2.5 times the CTE of the refractory metal.

12. The CoTWT of claim 1, where the refractory metal occupies less than one-third of the volume of the inner ring and less than one-fourth of the volume of the outer ring which are otherwise encased in resistive ceramic.

13. The CoTWT of claim 1, wherein the patterned metal further defines mode selectable structures on the solid resistive or laminar conductive tabs configured to pass a desired TEM mode and to control undesired modes.

14. The CoTWT of claim 1, wherein the RF band occupies a portion of 0.5 to 100 GHz.

15. The CoTWT of claim 1, wherein an RF signal propagates along the inner metal tube and an electron beam propagates in a gap between the inner and outer metal tubes, wherein the disks are spaced to slow propagation of the RF signal so that energy is transferred back-and-forth between the RF signal and the electron beam to amplify the RF signal, wherein the laminar conductive and solid resistive tabs pass a preferred transverse electromagnetic mode (TEM) and damp non-TEMs of the RF signal.

16. A co-axial traveling wave tube (CoTWT) for propagation and amplification of RF signals, comprising:

an outer metal tube having an axis, an inner metal tube positioned along the axis, a plurality of disks spaced apart by distance d along the inner metal tube, each said disk comprising, a central hub having a front-to-back thickness t1 that sets the overall thickness of the disk, said central hub formed of a refractory metal selected from Tungsten, Molybdenum and Tantalum having a first coefficient of thermal expansion (CTE1) and an electrical conductivity (e1);

one or more central ribs formed of the same refractory metal and positioned in an inner ring around the periphery of the central hub and having a front-to-back thickness t2<t1;

a resistive ceramic having a second CTE (CTE2) matched to CTE1 of the refractory metal that encases the one or more central ribs in the inner ring and extends radially to form an outer ring, wherein the refractory metal occupies less than one-third the volume of the inner ring and less than one-fourth the volume of the outer ring which are otherwise encased in the resistive ceramic, said resistive ceramic leaving exposed refractory metal surfaces including at least a portion of an outer surface of the central hub; and a patterned metal selected from Gold, Silver and Copper that plates the resistive ceramic and exposed refractory metal surfaces to electro-magnetically connect all exposed refractory metal surfaces and to form alternating solid resistive and laminar conductive tabs in the outer ring around the periphery of the disk, wherein said metal has an electrical conductivity e2>=e1, a thickness of 10-100 microns, is not CTE matched to the refractory metal and resistive ceramic, and a Young's Modulus of less than 100 GPa that allows the plating to plasticly deform, wherein the disk appears electro-magnetically to the RF band as if the disk were a solid refractory metal with resistive ceramic tabs spaced around its periphery.

17. A disk for use in co-axial traveling wave tube (CoTWT) for propagation and amplification of RF signals, said disk comprising:

a central hub having a front-to-back thickness t1 that sets the overall thickness of the disk, said central hub formed of a refractory metal having a first coefficient of thermal expansion (CTE1) and an electrical conductivity (e1);

one or more central ribs formed of the same refractory metal and positioned in an inner ring around the periphery of the central hub and having a front-to-back thickness t2<t1;

a resistive ceramic having a second CTE (CTE2) matched to CTE1 of the refractory metal that encases the one or more central ribs in the inner ring and extends radially to form an outer ring, said resistive ceramic leaving exposed refractory metal surfaces; and a patterned metal that plates the resistive ceramic and exposed surfaces of refractory metal to electro-magnetically connect all exposed refractory metal surfaces and to form alternating solid resistive and laminar conductive tabs in the outer ring around the periphery of the disk, wherein said metal has an electrical conductivity e2>=e1, is not CTE matched to the refractory metal and resistive ceramic, and a Young's Modulus of less than 100 GPa that allows the plating to plasticly deform, wherein the disk appears electro-magnetically to the RF band as if the disk were a solid refractory metal with resistive ceramic tabs spaced around its periphery.

18. The CoTWT of claim 17, where the refractory metal occupies less than one-third of the volume of the inner ring and less than one-fourth of the volume of the outer ring which are otherwise encased in resistive ceramic.

19. The CoTWT of claim 17, further comprising a plurality of U-shaped receptacles of the same refractory metal affixed around the periphery of the one or more central ribs and extending into the outer ring, said resistive ceramic filling a volume inside each U-shaped receptacle to form the solid resistive tabs and a volume between adjacent U-shaped receptacles and leaving exposed refractory metal surfaces including a portion of an outer surface of the central rib and an outer edge of the U-shaped receptacles, said patterned metal forming the laminar conductive tabs between the U-shaped receptacles and plating the exposed outer edges of the U-shaped receptacles to electromagnetically connect adjacent U-shaped receptacles and plating the exposed portion of the outer surface of the central rib.

20. The CoTWT of claim 17, wherein the refractory metal is one of Tungsten, Molybdenum and Tantalum and the patterned metal is one of Gold, Silver and Copper, wherein e2>e1 and the patterned metal has a CTE at least 2.5 times the CTE of the refractory metal.

* * * * *